US012636730B2

(12) United States Patent
Narumi et al.

(10) Patent No.: US 12,636,730 B2
(45) Date of Patent: May 26, 2026

(54) LASER PROCESSING APPARATUS

(71) Applicant: Panasonic Intellectual Property Management Co., Ltd., Osaka (JP)

(72) Inventors: Keiji Narumi, Saitama (JP); Mitsuoki Hishida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 969 days.

(21) Appl. No.: 17/816,723

(22) Filed: Aug. 1, 2022

(65) Prior Publication Data

US 2022/0371122 A1 Nov. 24, 2022

Related U.S. Application Data

(63) Continuation of application No. PCT/JP2021/003633, filed on Feb. 2, 2021.

(30) Foreign Application Priority Data

Feb. 5, 2020 (JP) ................................. 2020-017591

(51) Int. Cl.
*B23K 26/06* (2014.01)
*B23K 26/064* (2014.01)

(52) U.S. Cl.
CPC ...... *B23K 26/0665* (2013.01); *B23K 26/0613* (2013.01); *B23K 26/0648* (2013.01); *B23K 26/0652* (2013.01)

(58) Field of Classification Search
CPC ............ B23K 26/0665; B23K 26/0613; B23K 26/0648; B23K 26/0652; B23K 26/21; G02B 27/09

(Continued)

(56) References Cited

U.S. PATENT DOCUMENTS

2002/0158052 A1* 10/2002 Ehrmann ........... B23K 26/0736
219/121.75
2013/0215914 A1* 8/2013 Imai ........................ H01S 3/005
372/6

(Continued)

FOREIGN PATENT DOCUMENTS

CN 102837125 12/2012
JP 52-084748 7/1977
(Continued)

OTHER PUBLICATIONS

International Search Report of PCT application No. PCT/JP2021/003633 dated Apr. 13, 2021.
(Continued)

*Primary Examiner* — Topaz L. Elliott
*Assistant Examiner* — Daniel Ward Hatten
(74) *Attorney, Agent, or Firm* — Wenderoth, Lind & Ponack, L.L.P.

(57) ABSTRACT

A laser processing apparatus includes first and second laser oscillators that emit first and second laser lights (LB1), (LB2) having wavelengths different from each other, an optical fiber that guides first and second laser lights (LB1), (LB2), and laser head (50) configured to condense first and second laser lights (LB1), (LB2), respectively, at predetermined positions of a workpiece. Laser head (50) includes optical path difference generation unit (70) provided inside second housing (51). Optical path difference generation unit (70) is configured to make an optical path length of first laser light (LB1) inside second housing (51) longer than an optical path length of second laser light (LB2).

9 Claims, 3 Drawing Sheets

(58) Field of Classification Search
USPC .................................................... 219/121.78
See application file for complete search history.

(56) References Cited

U.S. PATENT DOCUMENTS

| 2015/0014889 A1* | 1/2015 | Goya ................. B23K 26/0652 |
| | | 219/121.72 |
| 2016/0167166 A1 | 6/2016 | Nagano et al. |
| 2016/0221120 A1 | 8/2016 | Narita et al. |
| 2020/0081261 A1* | 3/2020 | Treiser ................ A61F 9/00804 |

FOREIGN PATENT DOCUMENTS

| JP | 2006-119210 | 5/2006 |
| JP | 2014-079802 | 5/2014 |
| JP | 2015-044225 | 3/2015 |

OTHER PUBLICATIONS

Indian Office Action dated Nov. 4, 2025 for the related Indian Patent Application No. 202247049890.

* cited by examiner

LASER PROCESSING APPARATUS

This application is a continuation of the PCT International Application No. PCT/JP2021/003633 filed on Feb. 2, 2021, which claim the benefit of foreign priority of Japanese patent application No. 2020-017591 filed on Feb. 5, 2020, the contents all of which are incorporated herein by reference.

TECHNICAL FIELD

The present disclosure relates to a laser processing apparatus, and particularly to a laser processing apparatus that emits a plurality of laser lights having different wavelengths.

BACKGROUND ART

Conventionally, laser processing apparatuses that perform processing such as welding using laser light have been widely used, and among them, laser processing apparatuses that guide laser light including a plurality of wavelength components with an optical fiber to machine a workpiece have been proposed (See, for example, PTL 1).

CITATION LIST

Patent Literature

PTL 1: Unexamined Japanese Patent Publication No. 2014-079802

SUMMARY OF THE INVENTION

Technical Problem

In recent years, there has been proposed a technique for performing laser processing by simultaneously irradiating a workpiece with infrared laser light and visible laser light. For example, by simultaneously illuminating the workpiece with the near-infrared laser light and green laser light or blue laser light, the laser processing can be performed at high speed while increasing laser light absorptance in the workpiece.

On the other hand, conventionally, as disclosed in PTL 1 and the like, a laser processing apparatus having a configuration in which laser light generated by a laser light source is guided to a laser head by an optical fiber and the laser light is illuminated from the laser head toward a workpiece has been widely used. With such a configuration, it is easy to process workpieces having various shapes. Further, in this case, a condensing optical system including, for example, a collimating lens and a condensing lens is provided inside the laser head, and the laser light is condensed and emitted to a processing point of the workpiece.

However, in a normal condensing optical system, a phenomenon that a condensing position is also different when a wavelength of incident light is different occurs. This is called chromatic aberration of the condensing optical system. Usually, light having a shorter wavelength is condensed at a position closer to the condensing optical system.

When the workpiece is simultaneously illuminated with the infrared laser light and the visible laser light, a wavelength difference between the two laser lights increases, so that a difference between the condensing positions also increases, and it is very difficult to suppress this deviation.

The present disclosure has been made in view of such a point, and an object of the present disclosure is to provide a laser processing apparatus capable of reducing a difference of a converging position for each laser light in a case where laser lights having mutually different wavelengths are simultaneously illuminated from a laser head to a workpiece.

Solution to Problem

In order to achieve the above object, a laser processing apparatus according to the present disclosure includes at least: a first laser oscillator that emits first laser light having a first wavelength; a second laser oscillator that emits second laser light having a second wavelength; an optical fiber that receives and guides the first laser light and the second laser light, respectively; and a laser head connected to the optical fiber and configured to condense the first laser light and the second laser light at predetermined positions of a workpiece, respectively, wherein the first wavelength is shorter than the second wavelength, the laser head includes at least: a housing; and an optical path difference generation unit provided inside the housing, and the optical path difference generation unit is configured to make an optical path length of the first laser light inside the housing longer than an optical path length of the second laser light.

Advantageous Effect of Invention

According to the laser processing apparatus of the present disclosure, it is possible to reduce a difference in a condensing position for each of the first laser light and the second laser light.

BRIEF DESCRIPTION OF THE DRAWINGS

FIG. 1 is a schematic configuration diagram of a laser processing apparatus according to an exemplary embodiment of the present disclosure.

DESCRIPTION OF EMBODIMENT

Figure 2:
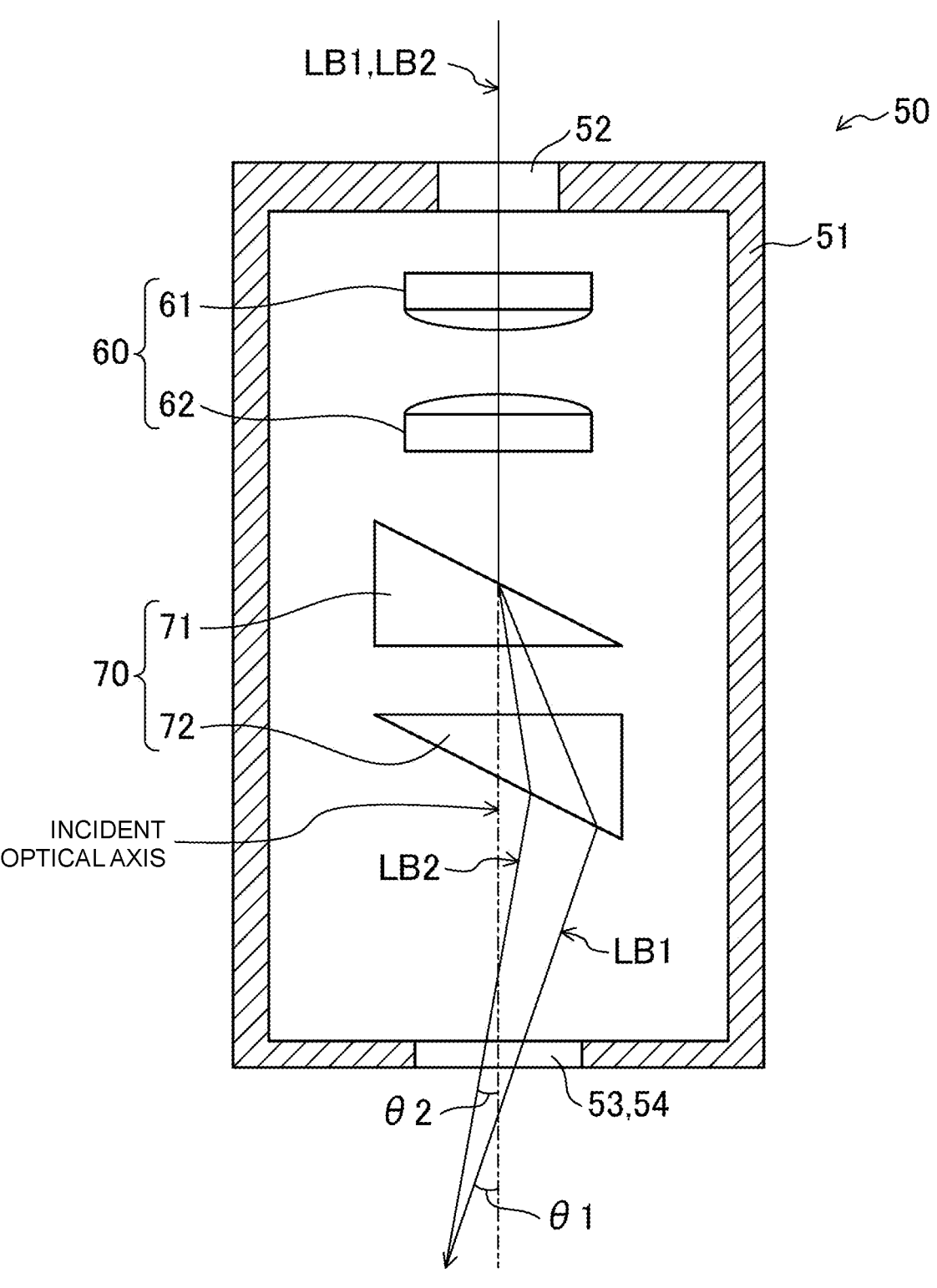
FIG. 2 is a schematic diagram illustrating an internal configuration of a laser head.

Hereinafter, an exemplary embodiment of the present disclosure will be described in detail with reference to the drawings. The following description of a preferable exemplary embodiment is merely illustrative in nature and is not intended to limit the present disclosure, application thereof, or use thereof.

Exemplary Embodiment

[Configuration of Laser Processing Apparatus]

Figure 1:
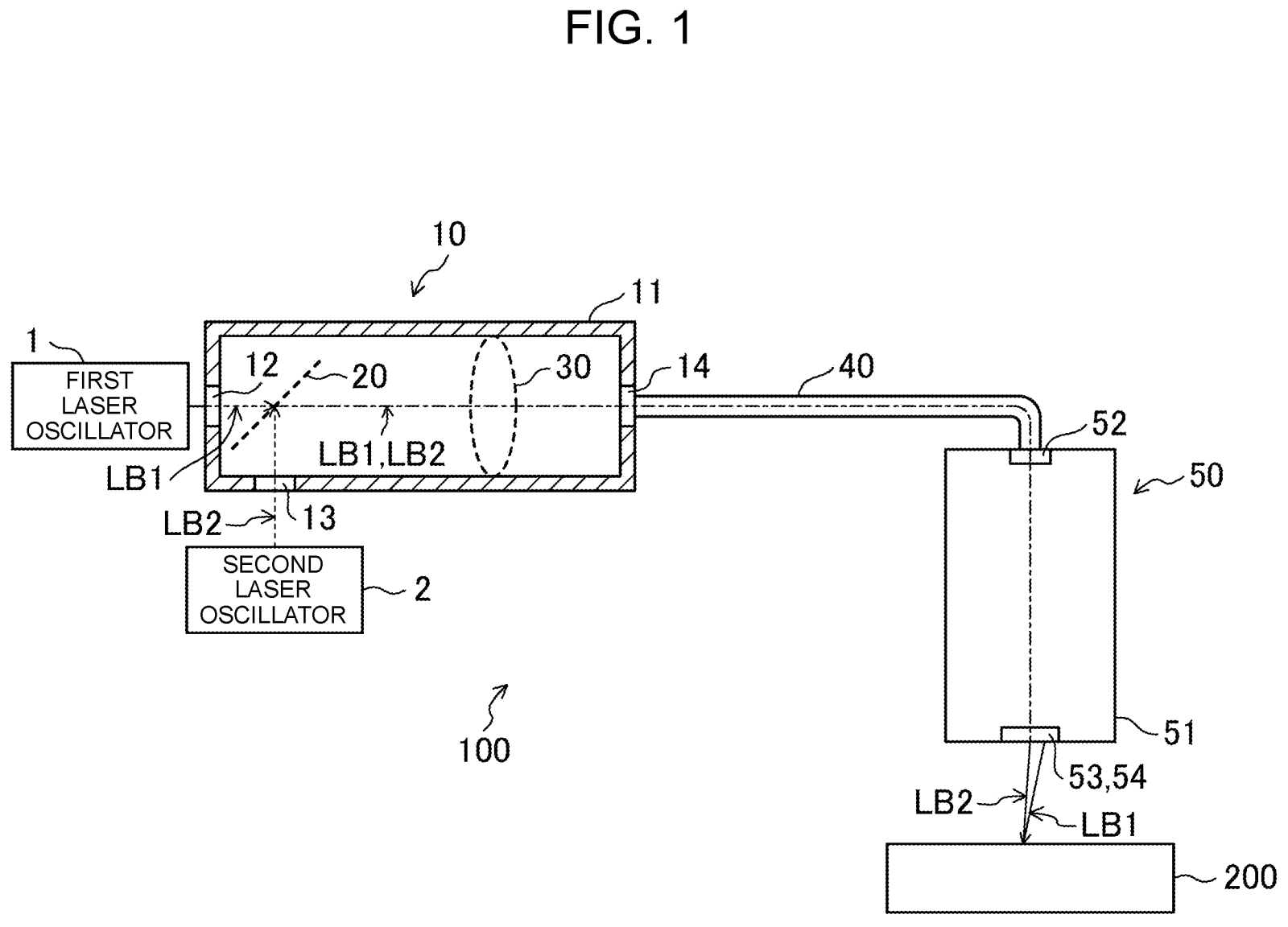

FIG. 1 illustrates a schematic configuration diagram of a laser processing apparatus according to the present exemplary embodiment, and laser processing apparatus 100 includes at least first laser oscillator 1, second laser oscillator 2, beam coupler 10, optical fiber 40, and laser head 50.

Note that laser processing apparatus 100 includes a power supply for driving first laser oscillator 1 and second laser oscillator 2, a controller that controls an output of the power supply to control an output of first laser light LB1 and second laser light LB2, and the like, but illustration and description thereof are omitted for convenience of description.

First laser oscillator 1 emits first laser light LB1 having a first wavelength, and second laser oscillator 2 emits second laser light LB2 having a second wavelength. The first wavelength is shorter than the second wavelength, and in the present exemplary embodiment, the first wavelength is about 400 nm to 450 nm, and the second wavelength is about 900 nm to 1100 nm. However, the present invention is not particularly limited thereto, and different values can be taken as appropriate. For example, the first wavelength may be about 500 nm to 550 nm. Preferably, the first wavelength ranges from 380 nm to 550 nm inclusive, and the second wavelength ranges from 800 nm to 1100 nm inclusive.

Each of first laser oscillator 1 and second laser oscillator 2 may be a solid-state laser light source, a gas laser light source, or a fiber laser light source. Alternatively, a semiconductor laser light source that directly uses light emitted from a semiconductor laser may be used. Further, a semiconductor laser array including a plurality of laser light emitters may be used.

Beam coupler 10 has a configuration including polarization beam combiner 20 and first condensing lens 30 inside first housing 11, and first housing 11 is provided with first window 12 for transmitting first laser light LB1 emitted from first laser oscillator 1, second window 13 for transmitting second laser light LB2 emitted from second laser oscillator 2, and first connection port 14 for connecting to optical fiber 40. First connection port 14 of first housing 11 and second connection port 52 of second housing 51 of laser head 50 are connected by optical fiber 40.

Polarization beam combiner 20 is a plate-shaped optical element, and is configured to transmit first laser light LB1 and reflect second laser light LB2.

Polarization beam combiner 20 is disposed such that its surface forms 45 degrees with respect to each of an optical axis of first laser light LB1 emitted from first laser oscillator 1 and an optical axis of second laser light LB2 emitted from second laser oscillator 2.

First laser light LB1 transmitted through first window 12 and second laser light LB2 transmitted through second window 13 are coupled by polarization beam combiner 20 so that their optical axes substantially coincide with each other.

Note that, in the specification of the present application, "substantially the same" or "substantially coincide" means the same or coincidence including the manufacturing tolerance of each component in laser processing apparatus 100 and the allowable tolerance of the arrangement relationship of each component, and does not mean that the two to be compared are the same or coincide with each other in a strict sense.

In addition, polarization beam combiner 20 may be configured to reflect first laser light LB1 and transmit second laser light LB2, so that first laser light LB1 and second laser light LB2 are coupled such that their optical axes substantially coincide with each other.

First condensing lens 30 condenses first laser light LB1 and second laser light LB2 coupled by polarization beam combiner 20, and causes first laser light LB1 and second laser light LB2 to be incident on a core (not illustrated) of optical fiber 40. Specifically, first laser light LB1 and second laser light LB2 are condensed toward first connection port 14 to which an end part of optical fiber 40 is connected. Note that other optical components may be disposed in beam coupler 10.

Optical fiber 40 is an optical member in which the core (not illustrated) which is an optical waveguide is covered with a clad (not illustrated) made of a material having a refractive index lower than that of the core. The core and the clad are coaxially disposed. Optical fiber 40 transmits first laser light LB1 and second laser light LB2 incident on core to laser head 50. Note that optical fiber 40 may have a plurality of the cores, and first laser light LB1 and second laser light LB2 may be incident on different cores. However, even in this case, it is preferable that the optical axis of first laser light LB1 and the optical axis of second laser light LB2 substantially coincide with each other at a preceding stage of condensing optical system 60 described later. As will be described later, this is because it is easy to make a difference between an optical path length of first laser light LB1 and an optical path length of second laser light LB2 inside laser head 50.

Laser head 50 is configured to receive first laser light LB1 and second laser light LB2 transmitted through optical fiber 40, and perform predetermined conversion on each of first laser light LB1 and second laser light LB2 inside. First laser light LB1 and second laser light LB2 subjected to the conversion are emitted from laser head 50 toward workpiece 200. An internal configuration of laser head 50 will be described in detail later.

[Configuration of Laser Head]

Figure 3:
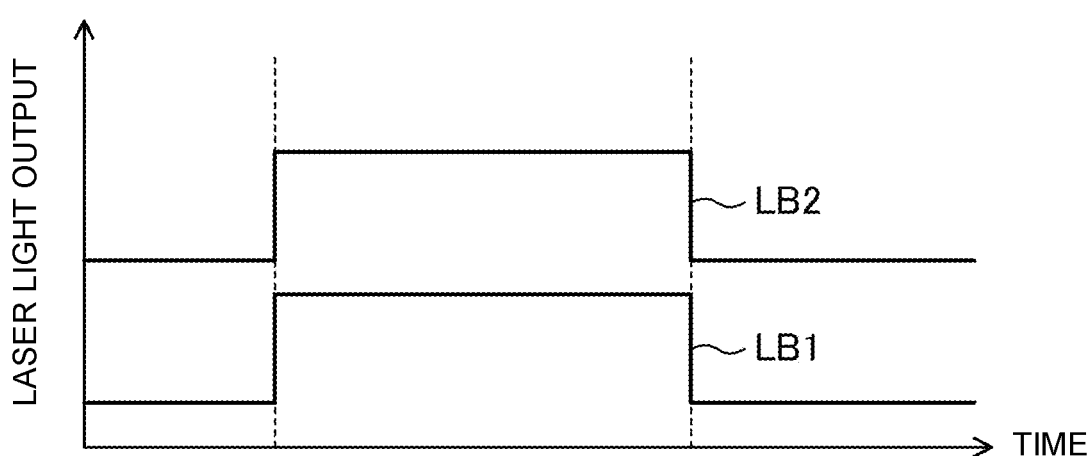
FIG. 3 is a diagram illustrating an example of output control of a first laser oscillator and a second laser oscillator.
Figure 3:
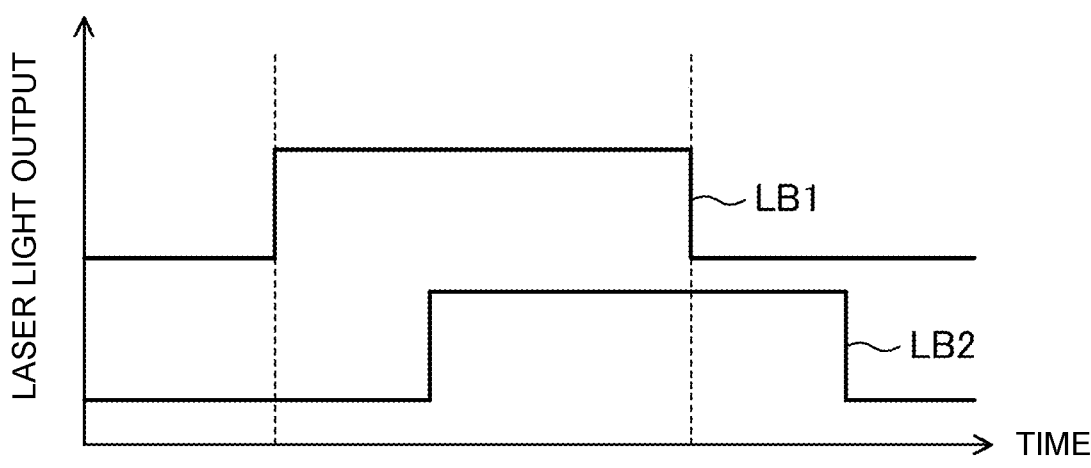

FIG. 2 is a schematic diagram of an internal configuration of the laser head. FIG. 3 illustrates an example of output control of the first laser oscillator and the second laser oscillator. Note that in FIG. 2, optical fiber 40 is not illustrated.

As illustrated in FIG. 2, laser head 50 includes second housing 51, condensing optical system 60, and optical path difference generation unit 70.

Second housing 51 has second connection port 52 and emission port 53, and one end of optical fiber 40 is connected to second connection port 52 as illustrated in FIG. 1. First laser light LB1 and second laser light LB2 incident on an inside of second housing 51 through optical fiber 40 pass through a plurality of the optical components described above in an inside of first housing 11, and are emitted from emission port 53 toward workpiece 200. Note that emission port 53 is provided with protective glass 54 so that fumes and the like do not enter an inside of laser head 50.

Condensing optical system 60 is provided inside second housing 51 and includes collimating lens 61 and second condensing lens (condensing lens) 62. Condensing optical system 60 is disposed between second connection port 52 of second housing 51 and optical path difference generation unit 70.

Collimating lens 61 is configured to convert first laser light LB1 and second laser light LB2 into collimated light, and second condensing lens 62 is configured to condense first laser light LB1 and second laser light LB2 transmitted through collimating lens 61. First laser light LB1 and second laser light LB2 travel on the same optical axis after entering laser head 50 until reaching first prism 71 described later. In the following description, this optical axis may be referred to as an incident optical axis.

Here, collimating lens 61 and second condensing lens 62 are lenses on which chromatic aberration correction is not performed, that is, so-called achromatization is not performed. Further, the material of each of collimating lens 61 and second condensing lens 62 is synthetic quartz, and is configured to transmit first laser light LB1 and second laser light LB2, respectively, and a loss at the time of transmission is less than or equal to a predetermined value.

Optical path difference generation unit 70 is provided inside second housing 51 and is a set of optical components including first prism (first optical component) 71 and second prism (second optical component) 72. Optical path difference generation unit 70 is disposed between emission port 53 of second housing 51 and condensing optical system 60.

Note that both first prism 71 and second prism 72 are made of synthetic quartz. Further, as illustrated in FIG. 2, the shapes of first prism 71 and second prism 72 are preferably triangular in cross-sectional view. However, the present invention is not particularly limited thereto.

When first laser light LB1 and second laser light LB2 are incident on first prism 71, an optical path of second laser light LB2 having a long wavelength is not largely bent. On the other hand, an optical path of first laser light LB1 having a short wavelength is bent larger than the optical path of second laser light LB2. Further, by passing through first prism 71, the optical paths of first laser light LB1 and second laser light LB2 are changed such that the optical axes of first laser light LB1 and second laser light LB2 are separated from the incident optical axis.

First laser light LB1 and second laser light LB2 transmitted through first prism 71 are incident on second prism 72, and the optical path of first laser light LB1 transmitted through second prism 72 is bent larger than the optical path of second laser light LB2.

Furthermore, by passing through second prism 72, the optical paths of first laser light LB1 and second laser light LB2 are changed such that the optical axes of first laser light LB1 and second laser light LB2 approach the incident optical axis. Therefore, the optical path of first laser light LB1 transmitted through second prism 72 is changed so that the first laser light approaches second laser light LB2.

Further, as illustrated in FIG. 2, the optical axis of first laser light LB1 emitted from emission port 53 of second housing 51 is inclined at first angle θ1 with respect to the incident optical axis of first laser light LB1, and the optical axis of second laser light LB2 emitted from emission port 53 of second housing 51 is inclined at second angle θ2 with respect to the incident optical axis of second laser light LB2.

Second angle θ2 is larger than 0 degrees, first angle θ1 is larger than second angle θ2, and first laser light LB1 and second laser light LB2 are focused on the same position of workpiece 200.

Further, in the present exemplary embodiment, as illustrated in FIG. 3, first laser oscillator 1 and second laser oscillator 2 are controlled such that a period during which first laser light LB1 is emitted and a period during which second laser light LB2 is emitted entirely overlap (part (a) of FIG. 3) or partially overlap (part (b) of FIG. 3).

That is, when the same position of workpiece 200 is simultaneously illuminated with first laser light LB1 and second laser light LB2, workpiece 200 is laser-processed.

Effects and the Like

As described above, laser processing apparatus 100 according to the present exemplary embodiment includes at least first laser oscillator 1 that emits first laser light LB1 having the first wavelength, and second laser oscillator 2 that emits second laser light LB2 having the second wavelength. The first wavelength is set to be shorter than the second wavelength.

Laser processing apparatus 100 includes optical fiber 40 that receives and guides first laser light LB1 and second laser light LB2, and laser head 50 that is connected to optical fiber 40 and configured to condense first laser light LB1 and second laser light LB2 at a predetermined position of workpiece 200.

Laser head 50 includes at least second housing (housing) 51 and optical path difference generation unit 70 provided inside second housing 51. Optical path difference generation unit 70 is configured such that the optical path length of first laser light LB1 inside second housing 51 is longer than the optical path length of second laser light LB2.

By configuring laser processing apparatus 100, particularly laser head 50 in this manner, workpiece 200 can be illuminated with first laser light LB1 and second laser light LB2 in a state in which the optical path length of first laser light LB1 having a short wavelength is longer than the optical path length of second laser light LB2 having a long wavelength. This makes it possible to reduce a difference between the condensing position of first laser light LB1 and the condensing position of second laser light LB2.

Laser head 50 further includes condensing optical system 60, and optical path difference generation unit 70 is configured to reduce the difference between the condensing position of first laser light LB1 and the condensing position of second laser light LB2 caused by the chromatic aberration of condensing optical system 60 so that first laser light LB1 and second laser light LB2 are condensed at the same position of workpiece 200.

With such a configuration of laser head 50, the same position of workpiece 200 can be illuminated with first laser light LB1 and second laser light LB2. This will be further described.

As illustrated in the present exemplary embodiment, when first laser light LB1 and second laser light LB2 having different wavelengths are emitted from same laser head 50, first laser light LB1 having a short wavelength is condensed at a position closer to laser head 50 than second laser light LB2 having a long wavelength due to the chromatic aberration of condensing optical system 60 provided in laser head 50. In particular, as illustrated in the present exemplary embodiment, when the first wavelength is about 400 nm to 450 nm and the second wavelength is about 900 nm to 1100 nm, the difference between the condensing position of first laser light LB1 and the condensing position of second laser light LB2 may spread to about dozens of mm to several tens of mm.

As described above, when the condensing positions of first laser light LB1 and second laser light LB2 are greatly different from each other, an illumination spot of the laser light on workpiece 200 becomes wider than a design value, and there is a possibility that desired processing cannot be performed. For example, when the condensing position of one laser light is set on a surface of workpiece 200, the condensing position of the other laser light is separated from the surface of the workpiece 200, the laser light cannot be illuminated with a desired intensity, and there is a possibility that laser cutting or laser welding cannot be performed well. Further, there is a possibility that a cutting width and a drilling diameter cannot be reduced, or a weld bead width is expanded to a predetermined value or more.

On the other hand, according to the present exemplary embodiment, by providing optical path difference generation unit 70 inside laser head 50, it is possible to cancel the difference between the condensing position of first laser light LB1 and the condensing position of second laser light LB2 caused by the chromatic aberration of condensing optical system 60. As a result, the same position of workpiece 200 can be illuminated with first laser light LB1 and second laser light LB2, and desired laser processing can be performed on workpiece 200.

Condensing optical system 60 preferably includes at least collimating lens 61 that converts each of first laser light LB1 and second laser light LB2 into collimated light, and second condensing lens (condensing lens) 62 that condenses each of first laser light LB1 and second laser light LB2 transmitted through collimating lens 61.

In this way, the predetermined position of workpiece 200 can be illuminated with first laser light LB1 and second laser light LB2.

The optical axis of first laser light LB1 emitted from laser head 50 is inclined at first angle θ1 with respect to the incident optical axis of first laser light LB1 from the time when first laser light LB1 is incident on laser head 50 to the time when first laser light LB1 reaches optical path difference generation unit 70. Further, the optical axis of second laser light LB2 emitted from laser head 50 is inclined at second angle θ2 with respect to the incident optical axis of second laser light LB2 from when second laser light LB2 is incident on laser head 50 to when second laser light LB2 reaches optical path difference generation unit 70. Second angle θ2 is larger than 0 degrees, and first angle θ1 is larger than second angle θ2.

In normal laser processing apparatus 100, laser head 50 is inclined to allow the laser light to be obliquely incident on a processing surface of workpiece 200. In this way, the return light of the laser light reflected by workpiece 200 is prevented from entering laser head 50 and adversely affecting the propagation of the laser light.

On the other hand, according to the present exemplary embodiment, first laser light LB1 and second laser light LB2 can be obliquely incident on the processing surface of workpiece 200 while laser head 50 remains upright with respect to the processing surface of workpiece 200. This simplifies the position control of laser head 50. Further, it is possible to prevent the return light of the laser light reflected by workpiece 200 from adversely affecting the laser light for processing.

Optical path difference generation unit 70 includes at least first prism (first optical component) 71 and second prism (second optical component) 72. First prism 71 is configured to change the optical paths of first laser light LB1 and second laser light LB2 such that the optical axis of first laser light LB1 is separated from the optical axis of second laser light LB2. Second prism 72 is configured to change the optical paths of first laser light LB1 and second laser light LB2 such that the optical axis of first laser light LB1 approaches the optical axis of second laser light LB2. Further, first laser light LB1 and second laser light LB2 transmitted through first prism 71 are incident on second prism 72.

By configuring optical path difference generation unit 70 in this manner, first laser light LB1 and second laser light LB2 can be emitted from laser head 50 in a close state, and the optical path length of first laser light LB1 inside laser head 50 can be easily made longer than the optical path length of second laser light LB2.

As a result, the difference between the condensing position of first laser light LB1 and the condensing position of second laser light LB2 caused by the chromatic aberration of condensing optical system 60 is reduced, and first laser light LB1 and second laser light LB2 can be condensed at the same position of workpiece 200.

Further, by using first prism 71 and second prism 72 as optical path difference generation unit 70, the optical path of first laser light LB1 having a short wavelength can be bent more than the optical path of second laser light LB2 having a long wavelength, and the optical path length of first laser light LB1 inside laser head 50 can be easily made longer than the optical path length of second laser light LB2.

Laser processing apparatus 100 further includes beam coupler 10 between first laser oscillator 1 and second laser oscillator 2, and the optical fiber 40.

Beam coupler 10 is preferably configured to couple first laser light LB1 and second laser light LB2 such that the optical axis of first laser light LB1 and the optical axis of second laser light LB2 are the same.

This makes it easy to cause first laser light LB1 and second laser light LB2 to enter one optical fiber 40. Further, the incident optical axis of first laser light LB1 and the incident optical axis of second laser light LB2 can be aligned, and it is easy to change the optical path lengths of first laser light LB1 and second laser light LB2 inside laser head 50 or to change the angles of the optical axes of first laser light LB1 and second laser light LB2 emitted from laser head 50.

Beam coupler 10 is configured to condense first laser light LB1 and second laser light LB2 that are coupled, and cause first laser light LB1 and second laser light LB2 to enter optical fiber 40, specifically, the core of optical fiber 40.

In this way, first laser light LB1 and second laser light LB2 can be guided to optical fiber 40 without loss, and the loss of first laser light LB1 and second laser light LB2 can be suppressed. As a result, damage to optical fiber 40 can be suppressed, and an increase in operating cost of laser processing apparatus 100 can be suppressed.

Preferably, the first wavelength ranges from 380 nm to 550 nm inclusive, and the second wavelength ranges from 800 nm to 1100 nm inclusive.

Various processing can be performed by setting the wavelength ranges of the first wavelength and the second wavelength as described above.

For example, although a copper material has a low light absorptance in the wavelength range of the second wavelength, by illuminating first laser light LB1 having the first wavelength simultaneously with second laser light LB2 having the second wavelength, optical absorption in the copper material is enhanced, and a temperature of a part illuminated with the first laser light LB1 and second laser light LB2 increases in a short time. Further, when a temperature of the copper material approaches a melting point, optical absorptance in the wavelength range of the second wavelength is rapidly improved, so that both first laser light LB1 and second laser light LB2 can be efficiently used for processing workpiece 200.

Furthermore, by setting the wavelength ranges of the first wavelength and the second wavelength as described above, it is possible to suppress the occurrence of sputtering and debris at the time of laser processing of workpiece 200. As a result, the processing quality of workpiece 200 can be improved.

Other Exemplary Embodiments

Note that laser head 50 illustrated in the exemplary embodiment may be retained by a robot arm (not illustrated) to constitute laser processing apparatus 100. In this way, laser head 50 can be brought to an appropriate position even for workpiece 200 having a complicated shape, and desired laser processing can be performed on workpiece 200.

INDUSTRIAL APPLICABILITY

When the workpiece is simultaneously illuminated with the laser lights having different wavelengths, the laser processing apparatus of the present disclosure can cancel the chromatic aberration generated in the internal optical system to reduce the difference in the condensing position for each laser light, which is useful for application to a high-output laser processing apparatus.

REFERENCE MARKS IN THE DRAWINGS 1 first laser oscillator
2 second laser oscillator

10 beam coupler
11 first housing
12 first window
13 second window
14 first connection port
20 polarization beam combiner
30 first condensing lens
40 optical fiber
50 laser head
51 second housing (housing)
52 second connection port
53 emission port
54 protective glass
60 condensing optical system
61 collimating lens
62 second condensing lens (condensing lens)
70 optical path difference generation unit
71 first prism
72 second prism
100 laser processing apparatus
200 workpiece
LB1 first laser light
LB2 second laser light
θ1 first angle
θ2 second angle

The invention claimed is:

1. A laser processing apparatus comprising at least:
a first laser oscillator that emits first laser light having a first wavelength;
a second laser oscillator that emits second laser light having a second wavelength;
an optical fiber that receives and guides the first laser light and the second laser light; and
a laser head connected to the optical fiber and configured to condense the first laser light and the second laser light at predetermined positions of a workpiece, respectively, wherein
the first wavelength is shorter than the second wavelength,
the laser head includes at least a housing, and an optical path difference generation unit provided inside the housing, and
the optical path difference generation unit is configured to make an optical path length of the first laser light inside the housing longer than an optical path length of the second laser light.

2. The laser processing apparatus according to claim 1, wherein
the first laser light emitted from the laser head has an optical axis that is inclined at a first angle with respect to an incident optical axis of the first laser light from when the first laser light is incident on the laser head to when the first laser light reaches the optical path difference generation unit,
the second laser light emitted from the laser head has an optical axis that is inclined at a second angle with respect to an incident optical axis of the second laser light from when the second laser light is incident on the laser head to when the second laser light reaches the optical path difference generation unit, and
the second angle is larger than 0 degrees, and the first angle is larger than the second angle.

3. The laser processing apparatus according to claim 1, wherein
the optical path difference generation unit includes at least a first optical component and a second optical component,
the first optical component changes optical paths of the first laser light and the second laser light, the first laser light having an optical axis separated from an optical axis of the second laser light, and
the second optical component changes optical paths of the first laser light and the second laser light, the first laser light having the optical axis approaching the optical axis of the second laser light.

4. The laser processing apparatus according to claim 3, wherein each of the first optical component and the second optical component is a prism.

5. The laser processing apparatus according to claim 1, wherein
the laser head further includes a condensing optical system, and
the optical path difference generation unit is configured to reduce a difference between a condensing position of the first laser light and a condensing position of the second laser light caused by chromatic aberration of the condensing optical system to condense the first laser light and the second laser light at an identical position of the workpiece.

6. The laser processing apparatus according to claim 5, wherein the condensing optical system includes at least a collimating lens that converts each of the first laser light and the second laser light into collimated light, and a condensing lens that condenses each of the first laser light and the second laser light transmitted through the collimating lens.

7. The laser processing apparatus according to claim 1, further comprising a beam coupler between the first laser oscillator and the second laser oscillator, and the optical fiber, wherein the beam coupler is configured to couple the first laser light and the second laser light to make an optical axis of the first laser light and an optical axis of the second laser light identical.

8. The laser processing apparatus according to claim 7, wherein the beam coupler is configured to condense the first laser light and the second laser light that are coupled and cause the first laser light and the second laser light to enter the optical fiber.

9. The laser processing apparatus according to claim 1, wherein the first wavelength ranges from 380 nm to 550 nm inclusive, and the second wavelength ranges from 800 nm to 1100 nm inclusive.

* * * * *